Patented Feb. 4, 1930

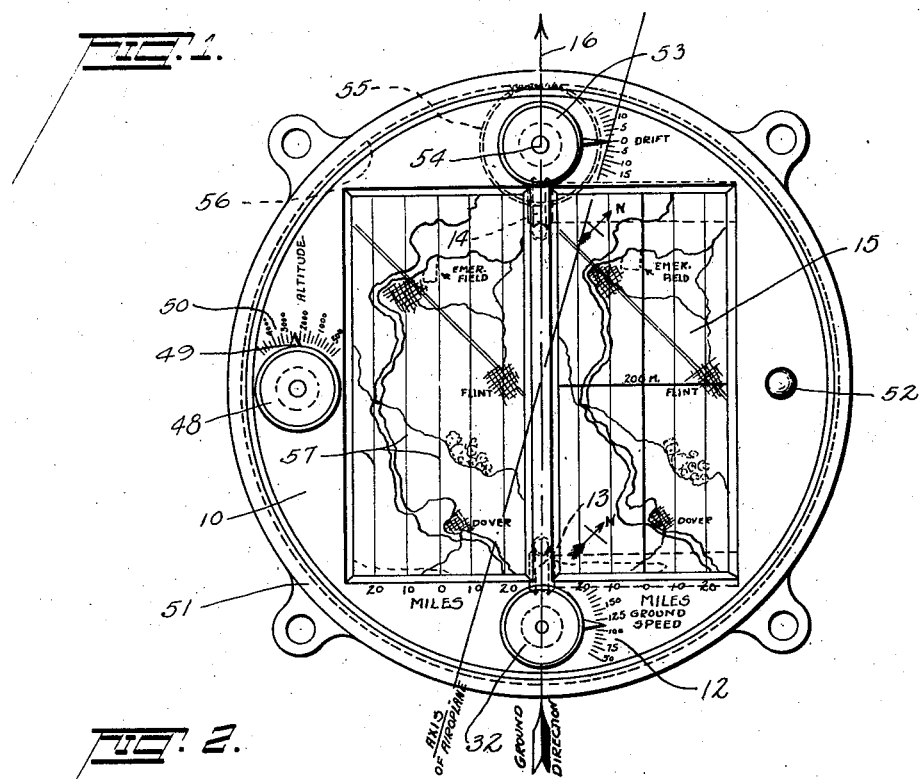

1,745,933

UNITED STATES PATENT OFFICE

ROBERT KAUCH, OF CAMP NICHOLS, PHILIPPINE ISLANDS, AND CHARLES L. PAULUS, OF DAYTON, OHIO

APPARATUS FOR MAINTAINING THE DIRECTION OF AIRCRAFT IN FLIGHT

Application filed February 1, 1926. Serial No. 85,406.

This invention relates to a method and apparatus for use by an aviator while in flight for determining if he is following the correct course; and if not, what his location is, by comparing a moving map of his given course with the terrain over which he is passing.

The main object of this invention is to provide an apparatus wherein the panorama of the earth, as seen from an aircraft, is disposed through suitable means to a position adjacent to a moving map of the same territory for the purpose of comparison.

Another object of this invention is to provide means wherein the map of the earth is moved at a comparative speed with that of the aircraft.

Another object of the invention is to provide means for adjusting the apparatus to compensate for the drift of the aircraft.

Another object of the invention is to provide means for bringing the panorama of the earth to a position for comparison purposes with the map, regardless of the altitude of the aircraft.

Other objects of the invention will appear further in the accompanying description.

In the drawings,

Fig. 1 is a plan view of the device.

Fig. 2 is a side elevation of Fig. 1.

Fig. 3 is an end view partly in section, showing the mechanism for driving the rolls, for reversing their rotation, and for controlling the rate of rotation.

Before describing this invention in detail, it is to be understood that the invention is designed for aircraft, and particular reference has been made to the same; but, the apparatus may also be adapted to other purposes.

One embodiment of our invention is illustrated in the above referred to drawings in which 10 represents a circular ring which is clamped to the aircraft, and which carries a circular rotating base 11. Rolls 13 and 14 are mounted on this base, and they carry a map 15 of the country over which the aircraft is passing, which moves from roll 13 to 14 in the direction indicated by the arrow 16.

These rolls are actuated by worm gears 17 and 18 carried on shafts 19 and 20 which mesh with worm wheels 21 and 22 of the rolls. A drive shaft 23 is provided in this particular instance with a fan 24 which effects the rotation of the shaft, when the aircraft is in motion and at a comparative rate of speed. This drive shaft carries bevel gears 25 and 26 at its ends which mesh with bevel gears 27 and 28 carried by the shafts 19 and 20, respectively, when the map is rotating in one direction; and with bevel gears 29 and 30 when rotating in the opposite direction. This change in rotation is effected by manipulation of a lever 31 which raises or lowers the shafts 19 and 20 as the case may be.

The rate of speed of the map and rolls is regulated by a knob 32 indicating ground speed on the graduated scale 12, which controls a friction governor 33, which comprises frame 34, adjustably mounted in a housing 35 by means of threads 36. One end of a rotatable shaft 37 is journaled in the frame 34, the other end being journaled in the housing 35. This shaft carries a large spur gear 38 which meshes with a smaller spur gear 39 carried by the shaft 19. The shaft 37 carries a plurality of spring members 40, firmly attached to the shaft at their top, and slidably mounted at their bottom, said spring members being provided with weights 41. A friction disk 42 is attached to the bottom of the spring members, and is designed to come into frictional contact with another friction disk 43 fixed to the lower end of the adjustable frame. It is evident that when the shaft 37 is rotated that the spring members will be extended, and the friction disk 42 pulled upward and in contact with friction disk 43, thereby retarding the rotation of the shaft. The speed of rotation of the shaft is directly proportional to the distance between the two friction discs when at rest, this distance being regulated by turning the knob 32 which raises or lowers the frame 34.

The map occupies a portion of one-half of the circular ring mounted on top of the base 11. Located in the other half thereof is a lens 44 equal in size to the exposed portion of the map, and located parallel to the aforesaid portion and above an opening in the base 11. There is also disposed beneath the lens 44 a secondary lens 45 which is adapted for adjustment up or down, through the rotation of a screw 46 located in the movable frame 47 of the lens 45. This screw is rotated by a knob 48, having a pointer 49 which indicates height in terms of feet on the graduated scale 50.

The map and operating mechanism together with the base 11 are mounted on the air craft by use of a clamp ring 51, and are rotatable within the last named part. Rotation of the base 11 is accomplished by the use of a knob 52 to make a return trip over a specified route. Final adjustment between the base 11 and the clamp ring 51 is obtained by the use of a knob 53 mounted on the shaft 54 which actuates a gear 55, meshing with an internally toothed gear 56 secured to the circular ring 10 and base 11 and integral therewith. Through the action of the mechanism just described, correction can be made for the drift of the aircraft with reference to the ground.

The following procedure is followed in the use of the device:

A map of the airway to be followed is first provided with suitable markings for showing distance and altitude. It is then placed in position on the rolls, and the speed at which it moves is corrected to coincide with the ground speed of the aircraft. The aircraft being in flight, the terrain over which it is passing is transposed to a position beside that of the moving map. Should the direction of the ground over which the aircraft is passing not appear as coinciding with that of the map, the proper correction is made by adjusting the knob 53 while looking through the lenses until a similarity is noticed in the ground over which the aircraft is traveling and the map. To further facilitate this procedure, calibrated lateral lines 57 are provided above the map 15, and the lens 44, by means of which a check is obtainable to further duplicate the appearance of the terrain and the map, so that the operator of the aircraft may determine if he is following the correct course by a comparison of the two. As previously indicated, the knob 48 is set to adjust the observation lens to correct for the difference in altitude, from that at which the map was originally taken. This correction is necessary as the terrain will appear, if the adjustment is not made, to be moving at different speeds at different heights, and also differ in appearance. However, it is often valuable information to the aviator to know just how high or low to fly; and he may, instead of making the correction, change his altitude. Thus the map not only serves as a means of aiding the aviator in his direction in a horizontal plane, but also in a vertical one. The altitude at which the map was photographed is indicated on the map. The map may either be made by flying at a constant altitude or, as preferred, by flying at a proper flying distance above the ground. While flying over hilly country, the map may be made at a higher altitude than is the case in flight over a level terrain. The aviator using the map can see at a glance whether to climb to higher altitude by the comparison of the terrain with the map. Upon termination of the cross country trip, the base 11 is rotated through 180 degrees, the driving mechanism being automatically reversed by the wind striking the opposite face of the fan 24, which reverses the direction of rotation of the driving shaft 23, and the return trip accomplished in the same manner as above described. In some cases it may be necessary to reverse the direction of rotation of the map to obtain similarity between the map and the panorama of the earth. To this end the reversing mechanism is provided, which through the use of the knob 52 and lever 31 disengages the gears 25 and 26 from gears 27 and 28 respectively and moves them into engagement with the gears 29 and 30 respectively which reverses the direction of rotation of the rolls for the above described purpose.

It is thus apparent from the aforegoing description that the invention has still further novelty in that a corrected ground speed is obtained by manipulation of the knob 32; altitude is indicated through any correction made by the knob 48; and lastly, that the drift of the aircraft is indicated by the correction of knob 53. Thus our invention provides a ground speed indicator, altitude indicator and drift indicator, as well as a course corrector, combined into one compact unit.

We claim:

1. In an apparatus for maintaining the course of an airplane in flight, a map of the course, means for continuously moving said map, means for controlling the rate of movement, and means for optically transposing a panorama of the course to a position for visual comparison with the map.

2. In an apparatus for maintaining the course of an airplane in flight, a map of the course, means for continuously moving said map, means for controlling the rate of movement, and means for optically transposing a panorama of the course to a position for visual comparison with the map, said means consisting of a lens focused upon the course.

3. In an apparatus for maintaining the course of an airplane in flight, comprising a map of the course, means for continuously moving said map, means for controlling the rate of movement thereof, and means adjacent said map for optically transposing a panorama of the course to a position for visual comparison with the map, regardless of the altitude of the airplane, said means consisting of a fixed lens, and a second lens mounted below and adjustable in relation to said first lens to obtain a corrected optical vision of said course.

4. In an apparatus for maintaining the course of an airplane in flight comprising a base member, a map of the course mounted on said base member, means for moving said map, means for optically transposing a panorama of the course to a position for visual comparison with said map, and means for reversing the movement of said map relative to said base member for the purpose described.

5. In an apparatus for maintaining the course of an airplane in flight, a map of the course, means for continuously moving said map along lines parallel to the ground course, said means comprising an air driven screw for effecting said movement, whereby the rate of said movement is comparative to that of the airplane, and means for optically transposing a panorama of the course to a position adjacent to the map.

6. In an apparatus for maintaining the course of an airplane in flight comprising a map of the course, means for moving said map with the same rate of speed comparatively as the airplane, means for positioning said moving map along a line parallel to the ground course of the airplane, means adjacent thereto for optically transposing a panorama of the ground course over which the aircraft is passing to a position for visual comparison with the map, manually operable means for reversing the direction of movement of said map to permit its being used on a return trip over the same course, and additional means coacting with said last mentioned means whereby said map may be moved in either a forward or reverse direction in order to obtain synchronous movement between the movement of said map and the apparent movement of the ground.

7. In an apparatus for maintaining the course of an airplane in flight, comprising in combination a base member having a map of the course thereon, means for continuously moving said map, means for controlling the rate of movement thereof, means for optically transposing a panorama of the course to a position for visual comparison with the map, and means for adjusting the map and said optical means about a vertical axis relative to said base member whereby to align the movement of the map with the apparent movement of the ground, so as to compensate for drift.

In testimony whereof we affix our signatures.

ROBERT KAUCH.
CHARLES L. PAULUS.